United States Patent [19]
Odobez

[11] Patent Number: 6,090,277
[45] Date of Patent: Jul. 18, 2000

[54] REACTOR FOR THE DEPURATION OF POLLUTED WASTE WATERS

[75] Inventor: Giambattista Odobez, Varese, Italy

[73] Assignee: GB. Odobez S.R.L., Varese, Italy

[21] Appl. No.: 09/214,121

[22] PCT Filed: May 6, 1997

[86] PCT No.: PCT/EP97/02309

§ 371 Date: Jan. 20, 1999

§ 102(e) Date: Jan. 20, 1999

[87] PCT Pub. No.: WO97/49640

PCT Pub. Date: Dec. 31, 1997

[30] Foreign Application Priority Data

Jun. 26, 1996 [IT] Italy ................................ M196A1291

[51] Int. Cl.[7] ................................ C02F 3/22; C02F 1/74; B01F 3/04
[52] U.S. Cl. .................. 210/194; 210/195.3; 210/195.4; 210/197; 210/220; 210/221.1; 210/221.2; 210/926; 261/DIG. 75
[58] Field of Search ................................ 210/194, 195.3, 210/195.4, 197, 220, 221.1, 221.2, 926; 261/DIG. 75

[56] References Cited

U.S. PATENT DOCUMENTS

| | | |
|---|---|---|
| 3,846,292 | 11/1974 | Lecompte, Jr. . |
| 3,984,323 | 10/1976 | Evens . |
| 4,009,100 | 2/1977 | Hess et al. . |
| 4,690,764 | 9/1987 | Okumura et al. . |
| 4,863,606 | 9/1989 | Ryall . |
| 5,057,230 | 10/1991 | Race . |
| 5,169,293 | 12/1992 | Yamamoto . |

FOREIGN PATENT DOCUMENTS

| | | |
|---|---|---|
| 1 147 264 | 11/1986 | Italy . |
| 5-277483 | 10/1993 | Japan . |
| 1486697 | 9/1977 | United Kingdom . |

*Primary Examiner*—Thomas M. Lithgow
*Attorney, Agent, or Firm*—Young & Thompson

[57] ABSTRACT

Polluted waste waters are introduced into a tank (1, 100) in which a number of cavitation oxygenizers (5, 6, 11) are installed close and parallel to the bottom of the tank and divided into three types, one (5) that expels re-circulated water and air, a second (6) that expels water, air and sludge and foam sucked in from the upper region of the tank, both these two types suited to causing turbulence (F1, F2–F3, F4) of the polluted water within the tank, and a third (11) suited to cause a further turbulent motion of the polluted water.

10 Claims, 6 Drawing Sheets

REACTOR FOR THE DEPURATION OF POLLUTED WASTE WATERS

CROSS REFERENCE TO RELATED APPLICATION

This application is the 35 USC 371 National Stage of International application PCT/EP97/02309 filed on May 6, 1997, which designated the United States of America.

FIELD OF THE INVENTION

The present invention concerns a reactor for the depuration of polluted waste waters, more especially a physical-chemical-biological type reactor with forced circulation to depurate industrial and civil residual polluted waters.

BACKGROUND OF THE INVENTION

The prior art comprises the use of air and/or oxygen biological reactors and is explained in detail below with an example and with reference to FIG. 1 in which:

E=entry of the water to be depurated,
N=neutralization tank,
CH=dosage of neutralization products,
V1=homogenization tank
V2=biological reaction tank,
V3=sludge decantering tank,
A=input of air or $O_2$
RF=sludge recycling, and
FS=waste sludges.

The administration of air or oxygen takes place in one of the following ways:

1—With compressed air or oxygen input through porous plates or pipes uniformly distributed on the bottom of the tanks V1 and V2;

2—With air or oxygen sucked in by a Venturi tube effect by pumps fitted with nozzles distributed in some points on the bottom of tanks V1 and V2;

3—With rotors set at the free surface of tanks V1 and V2 that raise the water and spray it into the surrounding air aerating it as it falls.

The drawbacks of the prior art are shown below:

at least three tanks are required in order to obtain neutralization also by means of chemical products;

it is necessary to add compressed air or oxygen to the water by means of porous plates or pipes, with a variable porosity, for instance between $30\mu$ and $250\mu$, that consequently generate micro-bubbles that expand reducing the gas-water contact surface, that is already scarce with the above porosity values.

administration by means of a few Venturi type nozzles, with large diameter water spouts, e.g. 40–80 mm., and with water pressure around 1.5–2 $Kg/cm^2$ does not enhance the dimensions of the air-water contact surfaces, because the same spout is not in a cavitation condition.

the air and oxygen, inside the ejector, are dragged and not intimately mixed into the water as would be desirable.

the water is raised by 1 or 2 meters with a centrifuge blade wheel and launched into the surrounding air; also in this case there are no relevant air-water contact surfaces are generated, given the scarce energy in breaking the surface tension (cavitation).

in none of the three cases for administration described above there is contemporary separation phenomenon by sludge flotation, but only re-mixing appears.

the roughness and limited dimensions of the air-water contact surfaces in the three methods described above do not lead to any useful natural correction of the pH and appreciable reduction of toxicity, owing to the presence of inorganic reduction substances (chemical reactions due to sufficient molecular dissolution of the oxygen).

the treatment of the waters produces waste sludges (FS).

the time of permanence in the homogenization and biological reaction tanks are practically limited to the value of the ratio between the volume of said two tanks and the hourly delivery of water to be depurated.

SUMMARY OF THE INVENTION

The present invention obviates the above mentioned drawbacks and, as characterized in the first claim, is a reactor comprising a tank to contain and depurate polluted water in which a number of oxygenizers, compliant with the Italian patent No. 1 147 264 by Ambrogio AFFRI, or equivalent ones, hence forth called cavitation oxygenizers or simply oxygenizers, administer recirculation air and water to the mass of polluted water and it is distributed so that in the entire mass of polluted water a first turbulence arises along the perimeter of the tank; therefore, in a rectangular, square or polygon tank the number of oxygenizers may all be directed the same way parallel to the bottom of the tank or else it may be more advantageous to divide them into two groups separated by a symmetry axis parallel to the tank bottom, one group in which the oxygenizers are pointed in one direction and the other in the opposite direction, always parallel to the tank bottom; in a circular tank the oxygenizers are set parallel to lines tangent to the circle of the tank.

In this context by—cavitation oxygenizers—or more simply—oxygenizers—we intend oxygenizers built in order to operate in conditions of outflow of the liquid in the zone where the water and air are mixed within their bodies at pressures lower than atmospheric pressure, in other words in conditions such that the total energy of the outflowing liquid is totally kinetic.

The invented reactor, with the above arrangement of the oxygenizers, in turn divided into first oxygenizers and second oxygenizers (as explained herein), is a forced circulation reactor. In it a second turbulent motion is also produced that re-circulates the polluted water from below towards the top of the tank and viceversa; in this way, three layers are formed that, starting from above, may be identified as first zone or sludges and foams zone, second zone or reaction and flotation zone, and third zone or depurated water or primary water zone. The first oxygenizers are uniformly distributed on one or more planes next to and parallel to the bottom of the tank, sensibly in the border region between the second and third zones, while the second oxygenizers are set on one or more planes coinciding with the above mentioned planes, but only in one part of the tank bottom.

The above layout of the oxygenizers has the purpose of creating the global circulation in the second zone of the liquid present in the tank by means of the thrust of the air-water mixture outflowing from the same oxygenizers. The polluted water to be depurated enters from one end of the tank and exits from the opposite side depurated. The re-circulating liquid, that is that circulating in the second zone, is sucked by a pump and sent under pressure to the first oxygenizers fed by a feeding pipe and by a water distribution network. All the first oxygenizers, thanks to the liquid under pressure that arrives to them and flows out of them through the nozzles, suck in atmospheric air through a first pipe extending beyond the upper level of the first zone.

The number of second oxygenizers suck in a mixture of air plus sludge and foam through a pipe opening in the first zone.

The highest horizontal plane in which all the oxygenizers lay defines the separation region between the second and third zones. The distribution of the first oxygenizers on their planes must have a density (n° of oxygenizers per square metre) such as to create, by means of the air flowing out of them, a flotation effect able to separate and maintain suspended in the reaction and flotation zone the active biological sludge that is generally self-generated with the polluting organic substances in the liquid. The above described layout of the oxygenizers is such that the moving liquid, that flows starting at the upper level at the highest plane of the oxygenizers, is continuously crossed by the air flowing out of the first oxygenizers, that is in all the second zone, although the oxygenizers do not occupy all the points. This ensures the effectiveness of the flotation that separates and distinguishes the quality of the liquid with the highest level of concentration of organic substances in said zone from the liquid with low concentration of residual organic substances in the underlying third zone.

The air plus the sludge and foam are formed in the first zone owing to the effect of flotation and they are sucked through each of the second pipes; the further passage through the second oxygenizers represents a first part re-circulation of the sludge and foam in the liquid biomass of the second zone, for reaction and flotation.

In identical fashion, a third pipe opening at its upper end in the second zone and at its lower end in the first zone where the pump sucks in depurated water creating a flow of the biomass that represents a second part re-circulation in the reaction and flotation zone, said pipe being fitted along its length with a partialization valve to adjust the quantity of liquid biomass to be re-circulated.

As an option the reactor may comprise a number of auxiliary oxygenizers each surrounded by a cylindrical collar and associated to a fourth pipe opening into the second zone in order to operate a third part re-circulation of the biomass attracted by the Venturi effect.

As a further option the reactor may comprise a surface scraping device when, owing to the high burden of pollution of the waters subjected to treatment, the production of surface sludges and foams is excessive and out of control.

The main advantages of the invention are:

while with the current technique the different functions are physically separated and take place in more than one tank, with the invention they all take place in a single compact structure, thus requiring significantly more limited space availability, the re-circulation of all the liquid mass through the oxygenizers, operated by a pump which re-circulates each hour a water volume multiple of the one entroduced each hour into the tank dependion on the pollution extent of the water under treatement, increases the air-water contact time, contact time which is expressed as a ratio between the volume of the tank and the hourly delivery, in $m^3/h$ of the waste water to be treated, according to the following formula:

$t=(R/E)(V/E)+(V/E)$ in which:

t is the contact time in hours,

R is the pump hourly delivery rate,

E is the polluted water hourly delivery in $m^3/h$, and

V is the volume of the tank in $m^3$.

Example: with (R/E)=2 and (V/E)=24, we have that t=48+24=72 hours;

in the case of a tank equipped with air compressors and porous plates the value t is simply equal to V/E=24 hours; that is to say that the invention, in the example considered, leads to values of contact time three times higher than usual (24 hours) in the prior art.

the distribution of the oxygenizers, in opposition upon their plane and the circulation of the waste water induced by their thrust, causes the micro-diffuision of the oxygen in the air to be uniform throughout the mass, as it is sucked in and in a state of liquid cavitation within the same oxygenizers. This micro-diffusion not only supports the biological reactions in the reaction zone (stage $V_2$ of the prior art), but also activates the oxide-reduction and the natural neutralization reactions both within the oxygenizers, and in the same reaction and flotation region (stage N and CH in the prior art); moreover it enhances the separation by flotation towards the reaction and flotation region also of particles in colloidal state (concentrator of sludges and foams in zone H, extractor of gaseous ammonia and volatile substances).

The zone in which clarification takes place replaces stage V3 in the prior art.

The re-circulation of sludges and sludges and foams is performed within, and not outside, the reactor, respectively by means of the second pipe and the pump and by means of the third pipes. In both cases the sludges pass through the oxygenizers set on the plane separating the second and third zones.

Important degrees of depuration, without producing sludge, are obtained. This gives rise to the advantage not only of requiring lesser dimensions for the follow through of various depuration stages, but also, given equal final results, of producing an overall lesser quantity of sludges.

The compactness and multi-function features of the reactor allowed to detect, during test experimenting, a close to full de-toxification of the waters, protecting and ensuring stability to an environment suited to bacterial life; moreover, owing to the flotation effect, the reactor also revealed its capacity in reducing, by separation and degradation, the presence of colouring and tenso-active substances that are also toxic components, in the out-flowing treated waters. The known techniques do not offer this capacity to an appreciable degree. The waters treated with the present reactor offer an uncommon quality stability and an aptitude to be treated in further refinement plants with high performances.

BRIEF DESCRIPTION OF THE DRAWINGS

The invention will be illustrated in further detail herein with an example of a embodiment and with reference to the drawings, in which the first figure serves as reference in order to appreciate the differences between the prior art and the invention; thus in the drawings

DETAILED DESCRIPTION OF THE INVENTION

Figures 1, 2:
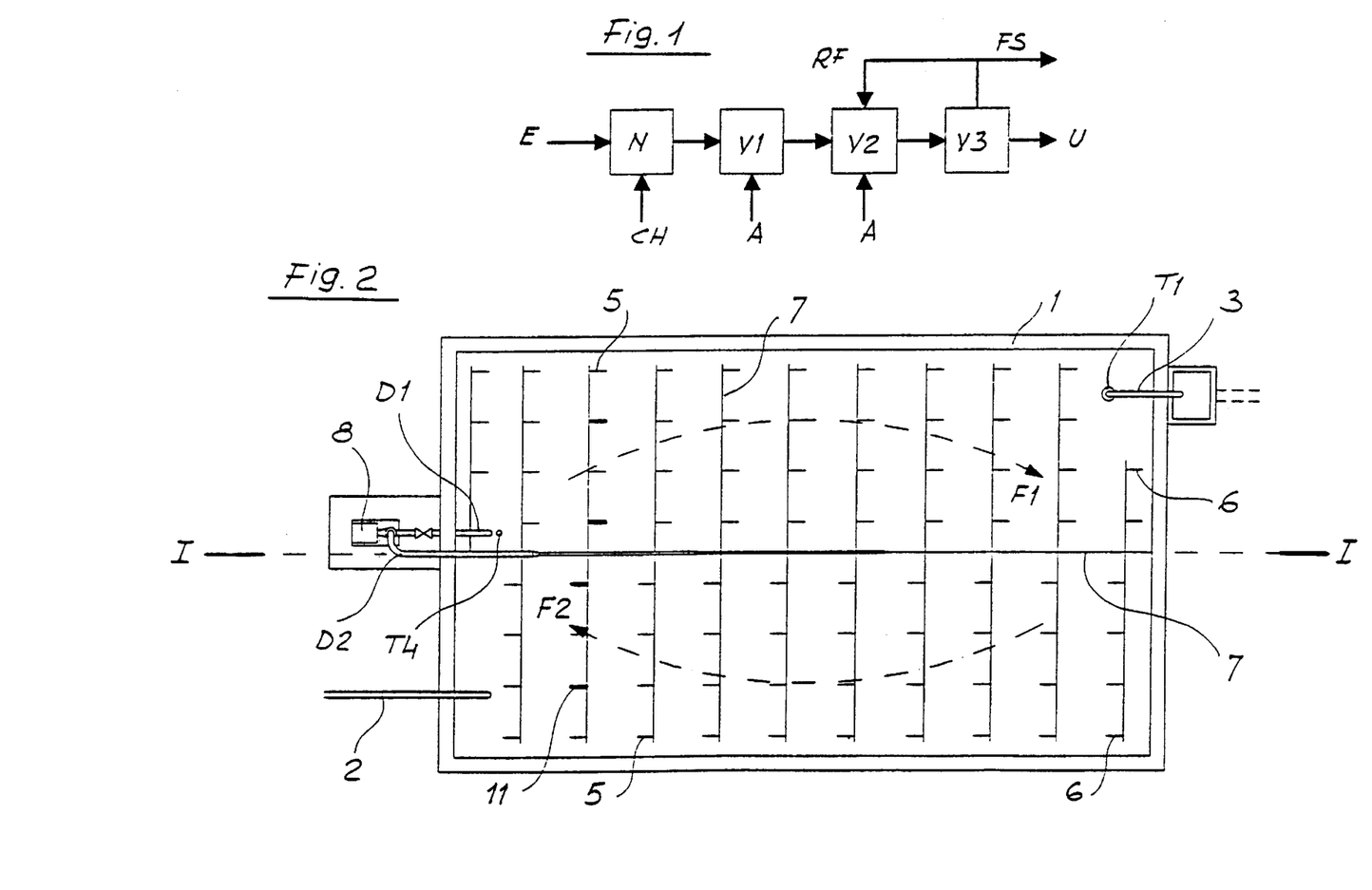
FIG. 1 is a block scheme.
FIG. 2 is a first plan view.

FIG. 1 has already been commented at the beginning of the present description.

Figure 3:
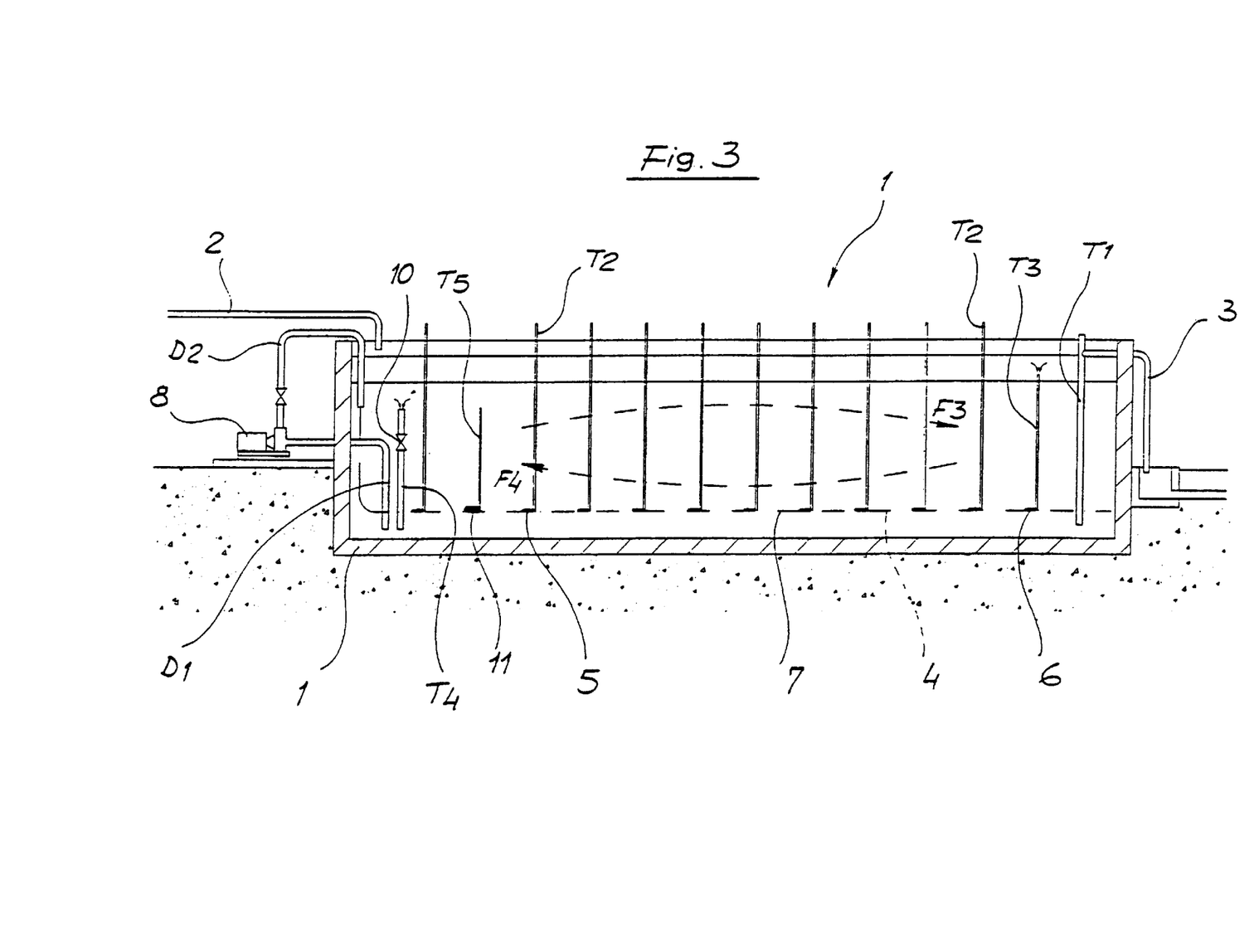
FIG. 3 is a longitudinal vertical cross-section.

FIGS. 2 and 3 together show a rectangular plan tank with a useful capacity of 2000 m³. The polluted water to be treated enters the reactor from duct 2 and exits depurated along the vertical pipe T1 and duct 3; on a plane 4 close to the bottom of the tank 1 n° 88 first oxygenizers 5 are installed with their axis parallel to the bottom of the tank and uniformly distributed on the two sides of the tank's longitudinal axis 1—1, n° 44 oxygenizers on one side are directed towards the right hand side of the figure according to arrow F1, and the other 44 are directed towards the left, according to arrow F2; similarly, 12 second oxygenizers 6 are installed, 6 of which are oriented towards the right and 6 towards the left, the said oxygenizers 5 and 6 are fed with water under pressure through a duct and a distribution network 7 fed by a pump 8 with delivery 100 m3/h with an 80 m. head and power absorption 28 kW; each of the first oxygenizers 5 is also associated to a first vertical pipe T2 opening above the upper level of the tank in order to suck in atmospheric air, while each of the second oxygenizers 6 is also associated to a second pipe T3 opening in the first zone in order to suck in a mixture of air plus sludge and foam so as to cause a part re-circulation of the sludge and foam in the second zone of the tank (see arrows F3 and F4); at least one third pipe T4 positioned with the upper end opening in the upper part of the second zone and the lower end opening in the region of the third zone where pump 8 sucks in the depurated water from duct D1 in order to return it to the second zone through the oxygenizers along ducts D2 and 7, said third pipe bearing a partializing valve 10, four auxiliary oxygenizers 11, two facing right and two left, respectively on one side and the other of the tank's longitudinal axis, that are installed close to the left side of the tank, each of them is fed by the water feeding and distribution network 7 and is surrounded by a cylindrical collar and associated to a fourth pipe T5 opening in the upper region of the second zone in order to cause a second re-circulation of the biomass by a Venturi effect (see detail in FIG. 5).

Figure 4:
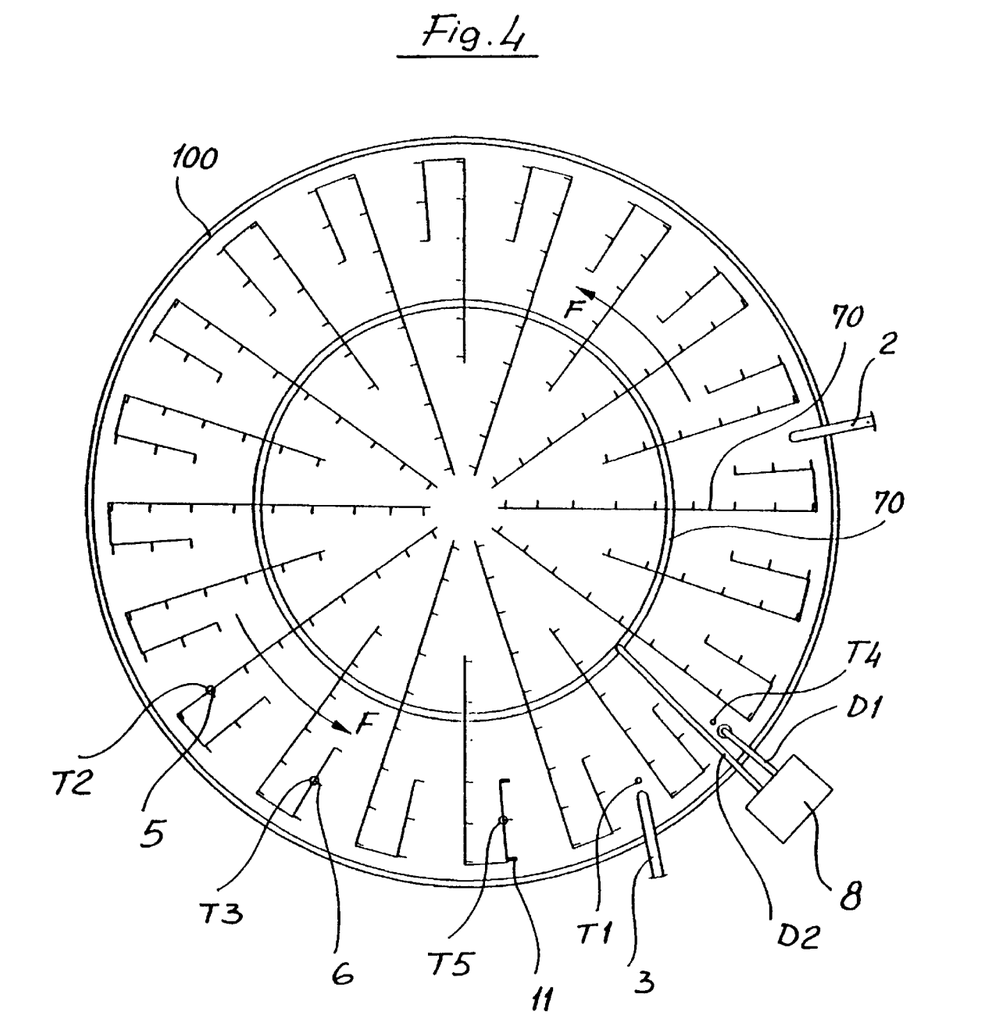
FIG. 4 is a second plan view.

FIG. 4 shows the distribution of oxygenizers 5, 6 and 11 in a tank with a circular plan 100; they are fed by a feeding and distribution network 70 and are oriented in directions parallel and tangent to the tank circle; the reactor is also fitted with parts 3, 8, D1, D2, T1, T2, T3, T4 and T5 already described with reference to FIGS. 2 and 3; the polluted water mass takes a circular motion according to arrows F.

Figure 5:
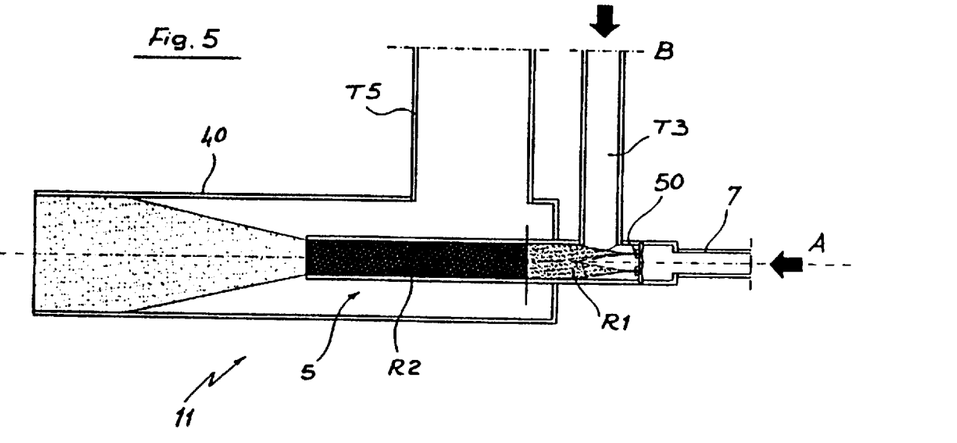
FIG. 5 is a view of a detail.

FIG. 5 shows an auxiliary oxygenizer 11 that comprises an oxygenizer 5 compliant with the quoted patent, but fitted with collar 40 conveniently extended past the outlet of the oxygenizer; the collar creates the effect of recalling water and sludge from the second zone through a fourth pipe T5; upstream, the oxygenizer 5 receives in A through duct 7 and from nozzles 50, re-circulated water under pressure from tile third zone, and from above, in B and from a pipe T3, it receives air, sludge and foam from the first zone. R1 refers to the region of greatest turbulence and ample exchange surface and R2 shows the region in which the air-primary water mixture is formed. It can be seen that collar 40 is closed in the section included between the connections of pipes T3 and T5.

Figure 6:
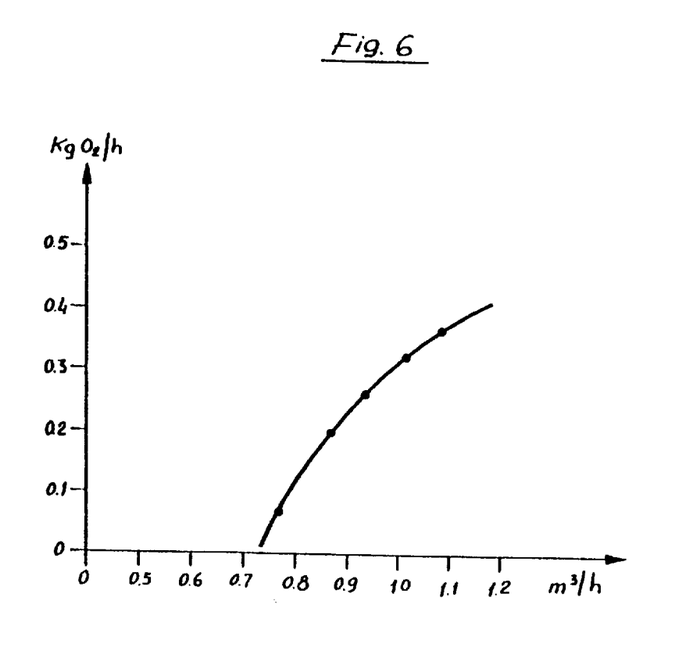
FIG. 6 is a diagram.

FIG. 6 is the experimental oxygenizer curve; it shows that the quantity of oxygen input into the tank 1 hourly is equal to 0.324×100 oxygenizers=32.4 Kg of oxygen/hour. The polluted water enters the tank through duct 2, with an average delivery of 35 m³/h.

The pollution parameters characterizing the water are as follows:

Chemical demand for O2 (C. O. D.)=1350 mg/l

Total tenso-active (95% non ion+5% anion)=150 mg/l

Sulphides+sulphites (toxic substances)=100 mg/l pH=4–4.5

After a real time of permanence or contact, t, with O2, equal to t=(R/E)×(V/E)+V/E=(100/35)×(2000/35)+(2000/35)= 220 hours the water exiting the duct 3 (FIGS. 2 and 3) has the following characteristics:

Residual chemical demand of $O_2$ (C.O.D.)=590 mg/l

Total tenso active=20 mg/l

Sulphides+sulphites=traces pH=6.6–6.8

The following performances can be inferred:

1—Abatement of O2 demand=(1350–590)/1350)×100= 56.29%

2—Abatement of tenso active=(150–20)/150)×100= 86.66%

3—Abatement of sulphides+sulphites (toxic substances)= 99.9%

4—Performance in terms of O2 used compared to quantity input=(0.76×35)/32.4)×100=82%

5—Natural correction of pH, that is without requiring the addition of chemical products, from values between 4 and 4.5 to values between 6.6 and 6.8.

Figure 7:
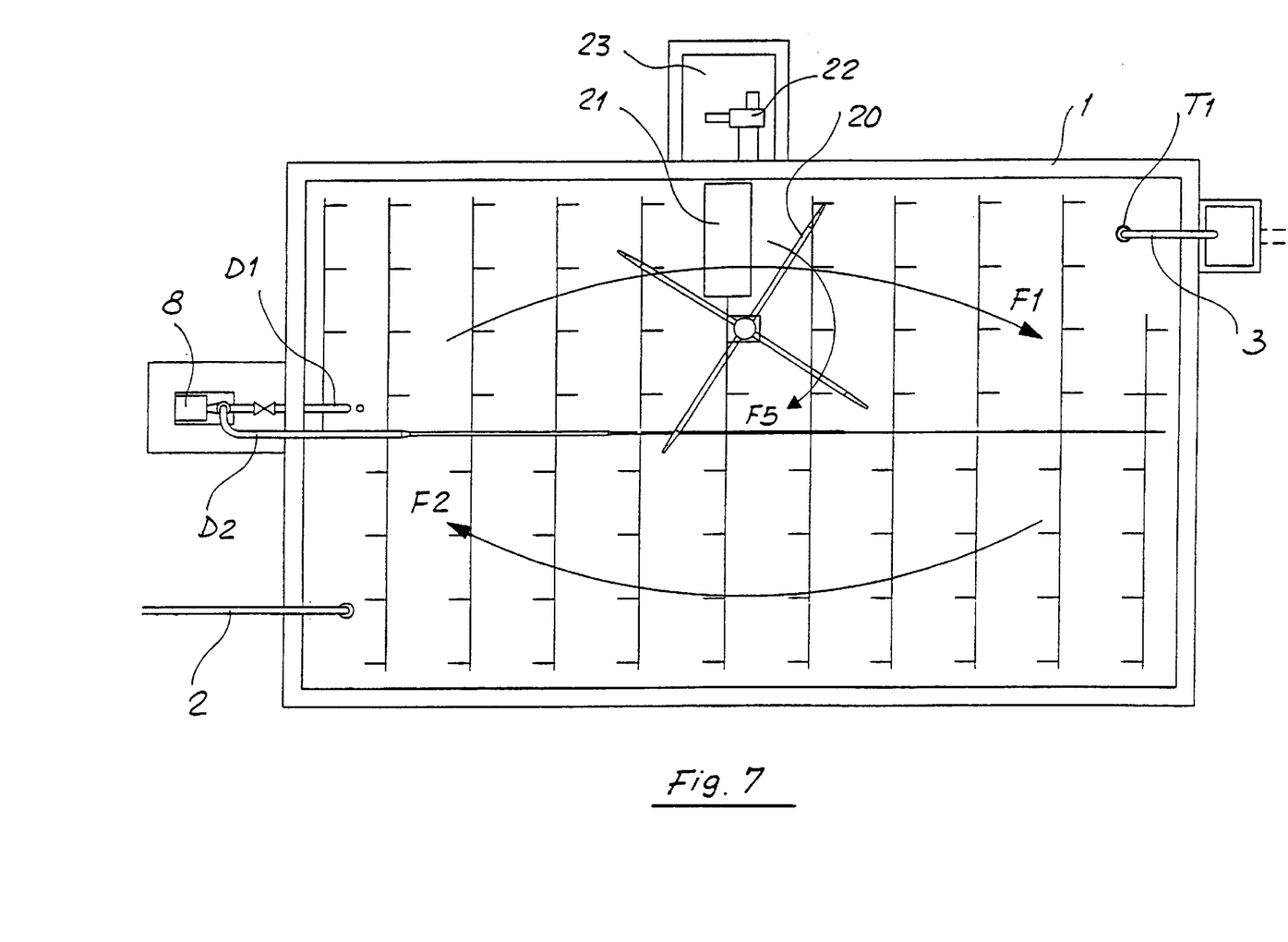
FIG. 7 is a third plan view.
Figure 8:
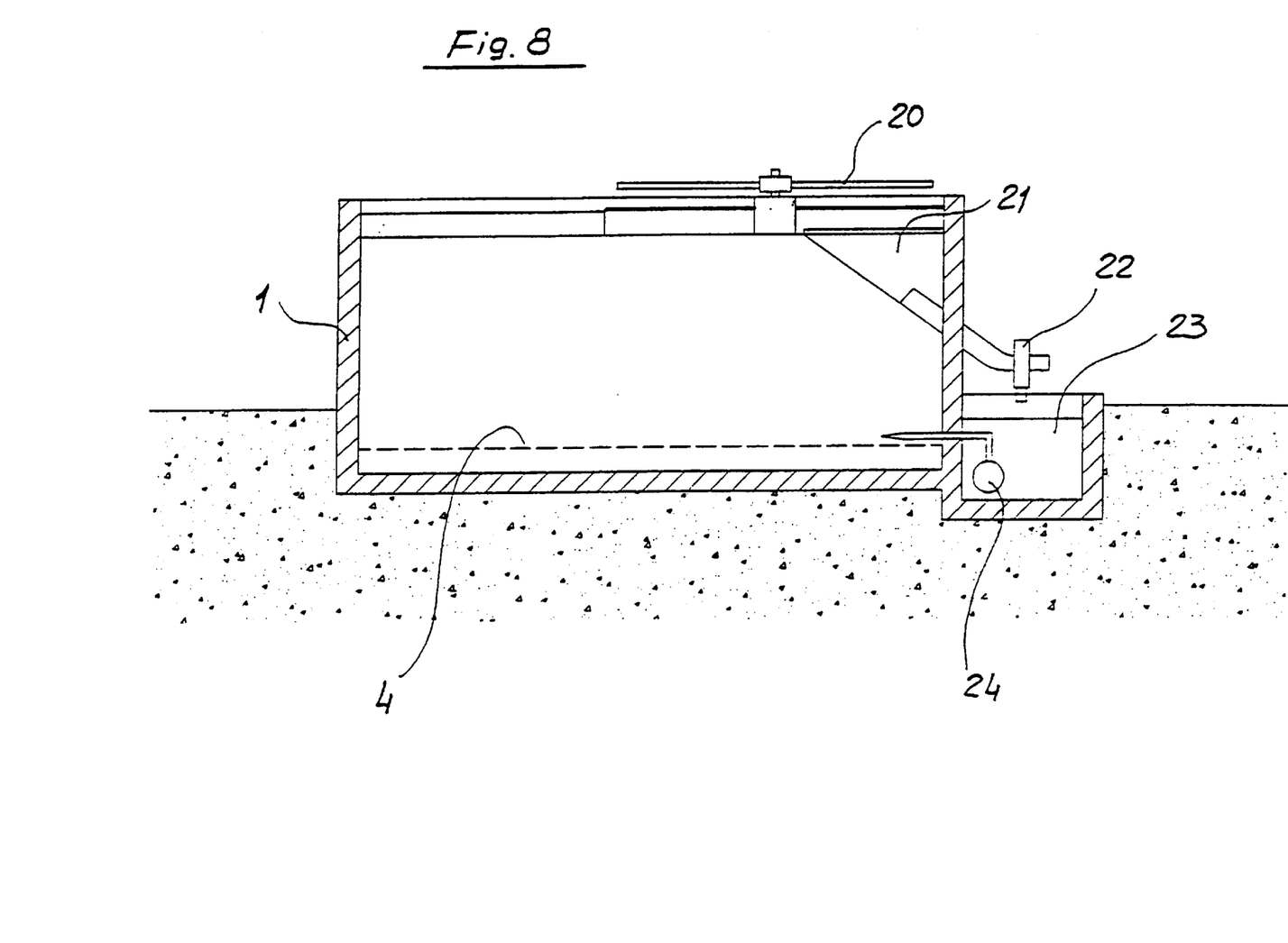
FIG. 8 is a transverse cross-section.

FIGS. 7 and 8 show a device for the removal of excess sludge and foam; the arms 20 rotating according to F5 above the upper border of the tank push this sludge and foam until they fall into the hopper 21 where a centrifuge sucker 22 sucks them up, breaks their surface tension and discharges them in liquid form into a discharge basin 23. It is understood that this device may be realized replacing the rotating arms with another means suited to "scraping" the sludge and foam and push them into the hopper, for example, a number of blades conveniently set on a wheel that revolves tangent to said upper border or else a jet of compressed air parallel to the edge of the tank pointed towards the hopper. A pump 24 provides for the re-circulation of the liquid sludge in the second zone of the reactor.

What is claimed is:

1. A reactor for the depuration of polluted waste waters which comprises: a) a tank (1, 100) into which the polluted waste waters are input and depurated, within said tank there are a number of cavitation oxygenizers (5, 6, 11) fed by pressurized re-circulated water (7) and set horizontally on at least one plane (4) close to the bottom of the tank, these oxygenizers being made up of first oxygenizers (5) that expel water and atmospheric air and second oxygenizers (6) that expel water and air plus sludge and foam sucked in in the higher region of the tank, both these numbers of oxygenizers (5,6) being set so as to cause a first turbulent motion (F1, F2) sensibly parallel to the lateral walls of the tank (1, 100), and a second turbulent motion (F3, F4) along the vertical planes of the tank in such a way as to cause the global circulation of the liquid in the tank and the formation of three zones, a first upper zone into which the air is transferred along with the sludge and foam, a second intermediate zone in which the reaction and flotation takes place and a third one, lower than said plane (4) in which the depurated water gathers; b) a pump (8) that sucks the depurated water into a region (9) in the third zone in order to return it into said second zone and at least one pipe (T4) with the lower end opening into the same said region (9) and with the upper end opening within the second zone so as to cause a first part circulation of liquid biomass within said second zone.

2. A reactor according to claim 1, wherein the pump (8) has an hourly delivery which is multiple of the quantity of polluted water hourly introduced into the tank (1, 100).

3. A reactor according to claim 1, wherein the tank is rectangular, square or polygon, and all the oxygenizers are set pointing in the same direction.

4. A reactor according to claim 1, wherein the tank is rectangular, square, or polygon, and the number of oxygenizers is divided into two groups separated by a symmetrical axis (I—I) parallel to the bottom of the tank, one group with the oxygenizers pointing in one direction (F1) and one in which the oxygenizers point in the opposite direction (F2).

5. A reactor according to claim 1, wherein the tank is circular, and within the circular tank (100) the oxygenizers (5, 6, 11) are oriented in a direction parallel to a number of tangents to the circular circle.

6. A reactor according to claim 1, further comprising a number of auxiliary oxygenizers (11) each surrounded by a collar (40) and associated to a second pipe (T3) and to a fourth pipe (T5) in order to obtain a third part re-circulation of the liquid biomass in said second zone, the collar (40) recalling it owing to the Venturi effect.

7. A reactor according to claim 6, wherein the distribution of said first oxygenizers (5) on their planes features a density such as to create a flotation effect that separates and maintains suspended in the second zone active biological sludge self-generating from polluting organic substances and the distribution of the auxiliary oxygenizers (11) features a density suited to re-circulating the liquid biomass in quantities proportional to the delivery of the treated water.

8. A reactor according to claim 1 wherein all the first oxygenizers (5), thanks to the pressurized liquid they receive and that flows out of them through the nozzles, suck in atmospheric air through a first pipe (T2) that extends past the upper level of the first zone and that all the second oxygenizers (6) suck in the mixture of air with sludge and foam through a second pipe (T3) opening into said first zone.

9. A reactor according to claim 1, further comprising means (20) suited to scraping the excess sludge and foam from the surface of said first zone and transfer them into a hopper (21) from which a centrifugal sucker (22) sucks them up, breaks their surface tension and discharges them in a liquid form into a gathering basin (23).

10. A reactor according to claim 9 wherein a pump (24) transfers the sludge and foam from said basin (23) to the second zone of the reactor.

* * * * *